United States Patent [19]

Tanoue et al.

[11] Patent Number: 4,459,137
[45] Date of Patent: Jul. 10, 1984

[54] GASIFICATION OF SOLID CARBONACEOUS MATERIALS

[75] Inventors: Toyosuke Tanoue; Masanobu Sueyasu; Mitsuichiro Fukuda, all of Osaka; Tohru Matsuo, Amagasaki, all of Japan

[73] Assignee: Sumitomo Metal Industries Limited, Osaka, Japan

[21] Appl. No.: 404,332

[22] Filed: Jul. 30, 1982

Related U.S. Application Data

[63] Continuation of Ser. No. 107,316, Dec. 26, 1979, abandoned.

[30] Foreign Application Priority Data

Dec. 26, 1978 [JP] Japan ................................ 53-164186

[51] Int. Cl.³ ............................................. C10J 3/46
[52] U.S. Cl. ...................................... 48/197 R; 48/206; 48/210; 48/92; 252/373
[58] Field of Search ................... 48/197 R, 206, 210, 48/192; 252/373; 75/60

[56] References Cited

U.S. PATENT DOCUMENTS 2,923,260  2/1960  Rummel ................................ 48/92
3,690,808  9/1972  Pierre ..................................... 48/92
3,746,534  7/1973  Szekely ................................. 75/60
4,062,657  12/1977 Knygrel et al. ...................... 48/77

FOREIGN PATENT DOCUMENTS 2443740  3/1975  Fed. Rep. of Germany ........ 48/206

OTHER PUBLICATIONS

La Rosa et al., Fuel Gas from Molten Iron Coal Gasification, IGT, Clean Fuels from Coal Symposium II, Jun. 1975, pp. 227–242.

*Primary Examiner*—Peter F. Kratz
*Attorney, Agent, or Firm*—Watson, Cole, Grindle & Watson

[57] ABSTRACT

The gasification of solid carbonaceous materials such as coal is achieved by directing a stream containing the carbonaceous materials onto a high temperature hot spot which has been formed on the surface of a bath of molten iron by oxygen jets blown thereagainst, the stream containing the carbonaceous materials emanating from a non-submerged, top-blowing lance, the oxygen jets emanating from the same lance or from different lances, and the bath of molten iron being contained in a reactor such that its total volume remains essentially constant.

9 Claims, 15 Drawing Figures

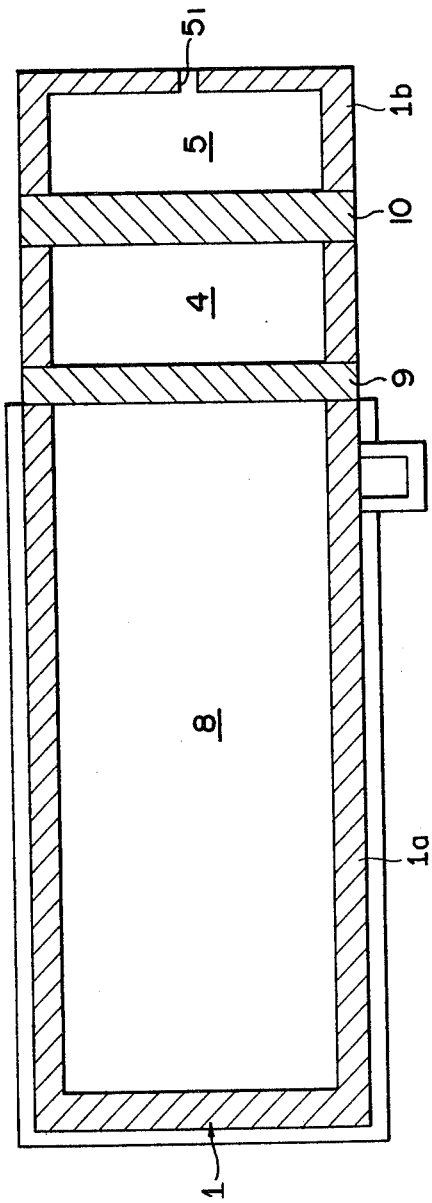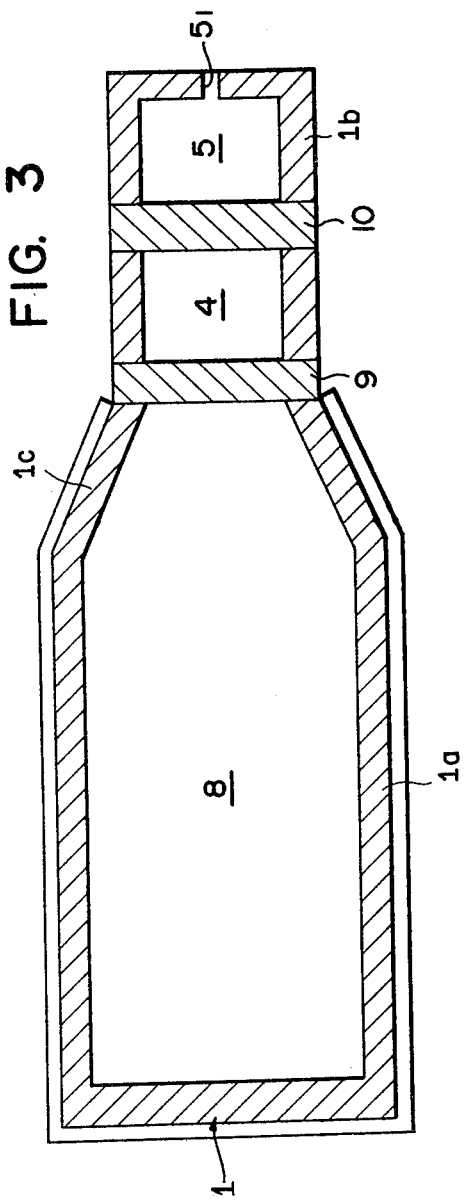

GASIFICATION OF SOLID CARBONACEOUS MATERIALS

This application is a continuation application of application Ser. No. 107,316, filed Dec. 26, 1979, now abandoned.

BACKGROUND OF THE INVENTION

1. Field of the Invention

This invention relates to a method for gasifying solid carbonaceous materials wherein the solid carbonaceous materials, in powdered form, are blown in a gas stream towards a bath of molten iron which has been contacted by streams of oxygen. The invention also relates to an apparatus for achieving the method, and to the lances which can be used to discharge the various gas streams.

2. Description of the Prior Art

Prior art methods for gasifying coal wherein the coal is dropped and dissolved directly in a bath of molten iron, and a gas such as oxygen or steam is blown into the both of molten iron through a lance so that the coal will be gasified by reaction with molten carbon are known, as for example shown in JA-OS Nos. 41604/52, 41605/52 and 41606/52, which applications were laid open for public inspection on Mar. 31, 1977. However, such methods of gasifying coal have numerous drawbacks, some of which are as follows:

I. The coal which is added to the molten iron is caught by the floating slag on the molten iron bath surface and although a part thereof is dissolved in the molten iron by agitation, much of the coal will disperse and be lost or else will float with the slag and not be gasified. Thus, the efficiency of the coal gasification will be low (not more than 80%) and the content of $CO_2$ in the produced gas will be high (not below 5 to 6%). An effective gasification will not be obtained.

II. The sulfur in the above-mentioned floating coal will react directly with the added oxygen to produce $SO_x$ and therefore the sulfur which is not contained in the produced gas will be lost.

III. Since the locations of impingement with the molten iron bath of the coal and the blown oxygen or steam are different, an extremely high temperature hot spot will be formed on the surface of the molten iron, and therefore a significant loss of molten iron by the evaporation will result. A large amount of combustible metal iron containing microgranules of carbon will then be contained in the produced gas, and the dust treatment thereof will be dangerous. Further the molten iron will be increased by the slight amount of iron contained in the added coal but, depending on the kind of coal used, loss of molten iron by the evaporation will be larger than the above-mentioned increase and thus control of the operation will be difficult.

IV. There is no way to keep the amount of produced slag constant. Since the amount of slag greatly influences the desulfurization and the efficiency of utilization of coal, it is important to the gasification of the coal to keep the amount of slag constant.

An object of the present invention is to provide a method of gasifying solid carbonaceous materials wherein such defects as mentioned above are eliminated.

Another object of the present invention is to provide an apparatus for gasifying solid carbonaceous materials wherein the efficiency of utilization of the solid carbonaceous materials is high and the content of impurities in the produced gas is very low.

A further another object of the present invention is to provide a non-submerged, top-blowing lance which can achieve the above-mentioned gasification efficiently.

SUMMARY OF THE PRESENT INVENTION

The method of gasifying solid carbonaceous materials according to the present invention is characterized in that an array of oxygen-containing jets is blown against the surface of a bath of a fixed amount of molten iron to form a high temperature hot spot thereon and a stream containing the carbonaceous material in powdered form is simultaneously blown towards the hot spot along a path extending interiorly of the array of jets, the jets emanating from at least one non-submerged, top-blowing lance.

The apparatus for gasifying the solid carbonaceous materials according to the present invention comprises a gas-tight reactor, a molten iron pouring device, a produced gas recovering duct device (provided above the reactor), a device for keeping the level of the floating slag on the surface of the bath of molten iron in the reactor constant, and at least one non-submerged top-blowing lance having at least one nozzle positioned above the surface of the bath of molten iron.

Further, the non-submerged, top-blowing nozzle to be used for the gasification of solid carbonaceous materials according to the present invention comprises a central nozzle for blowing a stream containing the solid carbonaceous powder onto the surface of the bath of molten iron, as well as peripheral nozzles for blowing jets containing oxygen onto the above-mentioned bath surface, a portion of the central nozzle being gradually reduced in diameter in the direction of the nozzle mouth.

More specifically, according to the present invention steam of powdered material together with a carrier gas (such as oxygen, steam, gaseous $CO_2$ or air) is blown from one or a plurality of non-submerged, top-blowing lances toward a high temperature hot spot formed on the surface of a bath of molten iron by an array of oxygen-containing jets blown in through the above-mentioned lances. The noted stream may, if desired, include a flux powder mixed with the carrier gas and the carbonaceous material. The number of utilized lances (hereinafter called blowing lances) will be related to the size of the reactor in which the bath of molten iron is contained.

Based on experiments on the relationship between (a) the addition of steam and coal to a high temperature hot spot on the surface of a bath of molten iron which has been formed by an oxygen jet traveling at a speed of Mach 1 to 3 at the nozzle outlet of the blowing lance and (b) the dissolution of the coal, the present inventors have found that when the coal granularity is not more than 4 mm and the water content of the coal is not more than 4%, and when the coal powder is added by a carrier gas having a dynamic pressure which is equal to or higher than the dynamic pressure of the oxygen jet or else when the stream of coal and carrier gas is enclosed interiorly of the jet oxygen jets even if the equal dynamic pressure cannot be obtained and is blown to the hot spot formed by the oxygen jets, it will be possible to make the amount of coal caught by the slag very small and to effectively dissolve and diffuse the coal powder in the molten iron.

The following methods represent embodiments of the present invention:

(1) The coal powder and a carrier gas, such as oxygen, steam, air, gaseous $CO_2$, recycled make gas, combustion exhaust gas generated in a produced slag discharge chamber or a coke furnace gas, together are blown through separate blowing lances into a jet stream formed by the oxygen jet and are blown in together with the oxygen jet stream toward a high temperature hot spot.

(2) The coal powder and a mixture of several kinds of gas such as oxygen, steam and gaseous $CO_2$, with or without added flux are blown in as mixed fluid through a single nozzle of a blowing lance toward a high temperature hot spot formed by the oxygen jet;

(3) The coal powder and one or more of oxygen, steam and gaseous $CO_2$ are mixed and are blown in through the center nozzle of blowing lances having multiple nozzles, and the remaining gas, for example, such as oxygen or $CO_2$ are blown in through the nozzles arranged around the center nozzle toward the high temperature hot spot formed by the oxygen jet. (As mentioned in (2) and (3), by using blowing lances having multiple nozzles wherein a mixed fluid of several kinds is blown in through a blowing lance of a single nozzle structure or, for example, a mixture of coal powder and steam or gaseous $CO_2$ is blown in through a center nozzle and oxygen is blown in through nozzles arranged around the central nozzle, the number of the lances may be fewer than that in the method wherein oxygen, steam, gaseous $CO_2$ and coal powder are blown in through respective independent blowing lances);

(4) The oxygen, steam and $CO_2$, either separately or as a mixed fluid are blown through a blowing lance having either a single nozzle or many nozzles onto the molten iron bath on the produced gas discharging side in addition to the blowing lances blowing in the oxygen, steam, gaseous $CO_2$ and coal powder independently in the above-mentioned embodiment (1), the blowing lances blowing in several combinations of oxygen, steam or gaseous $CO_2$, and coal powder and flux as a mixed fluid through a single nozzle in the above-mentioned embodiment (2) and the many arranged lances blowing in a mixed fluid of steam or gaseous $CO_2$ and coal powder through a central nozzle, and oxygen through nozzles arranged around the central nozzle in the above-mentioned embodiment (3). This embodiment (4) provides the high coal gasification efficiency. That is to say, according to the present invention, when coal, steam and $CO_2$ gas are simultaneously added to a high temperature hot spot formed by an oxygen jet and oxygen with or without steam and/or $CO_2$ gas is further blown onto the produced gas discharging side, the dissolution and thermal decomposition of the coal, the CO-producing reaction and the water gas reaction in the molten iron will be effectively enhanced and the efficiency of the utilization of the coal will be greatly increased. Further, as the temperature of the hot spot is greatly reduced by the thermal decomposition reaction of coal and aqueous gas-making reaction by steam from about 2500° C. generally known for the oxygen top blowing converter furnace for making steel, the iron dust in the produced gas will be reduced to lower than about 30 gr/Nm³ (about 1/10 normal).

Further objects, advantages and features of the present invention will become more fully apparent from a detailed consideration of the arrangement and construction of the constituent parts as set forth in the following specification taken together with the accompanying drawings.

BRIEF DESCRIPTION OF THE DRAWINGS

FIG. 2 shows a view along line II—II of FIG. 1 when constructed according to a first particular mode;

FIG. 3 shows a view taken along line II—II of FIG. 1 when constructed according to a second particular mode;

DETAILED DESCRIPTION OF THE PREFERRED STRUCTURAL EMBODIMENTS

An embodiment of the apparatus of the present invention shall be explained in the following. It should initially be recognized that the apparatus has been constructed with the following in mind: when oxygen, steam or gaseous $CO_2$, coal powder and flux are blown via non-submerged top-blowing lances onto a hot spot on the top of a bath of molten iron which has been formed by an oxygen jet, the amount of coal caught by the slag layer on the molten iron will be greatly reduced and the coal will be effectively dissolved and diffused into the molten iron. At the same time, it is preferable to keep the sulfur in the molten iron (which is the surface-active element) not higher than about 2% and to have a portion of the slag removed such that its amount stays constant (and such that its surface to keep the amount of slag constant and to keep its residence time on the molten iron bath not excess of about 2 hours. Therefore, it is of course necessary to keep the amount (melt level) of the molten iron constant and, as a result, to make the thickness of the slag layer constant. The apparatus of the present invention has such structure that can satisfy the above-mentioned requirements.

Figure 1:
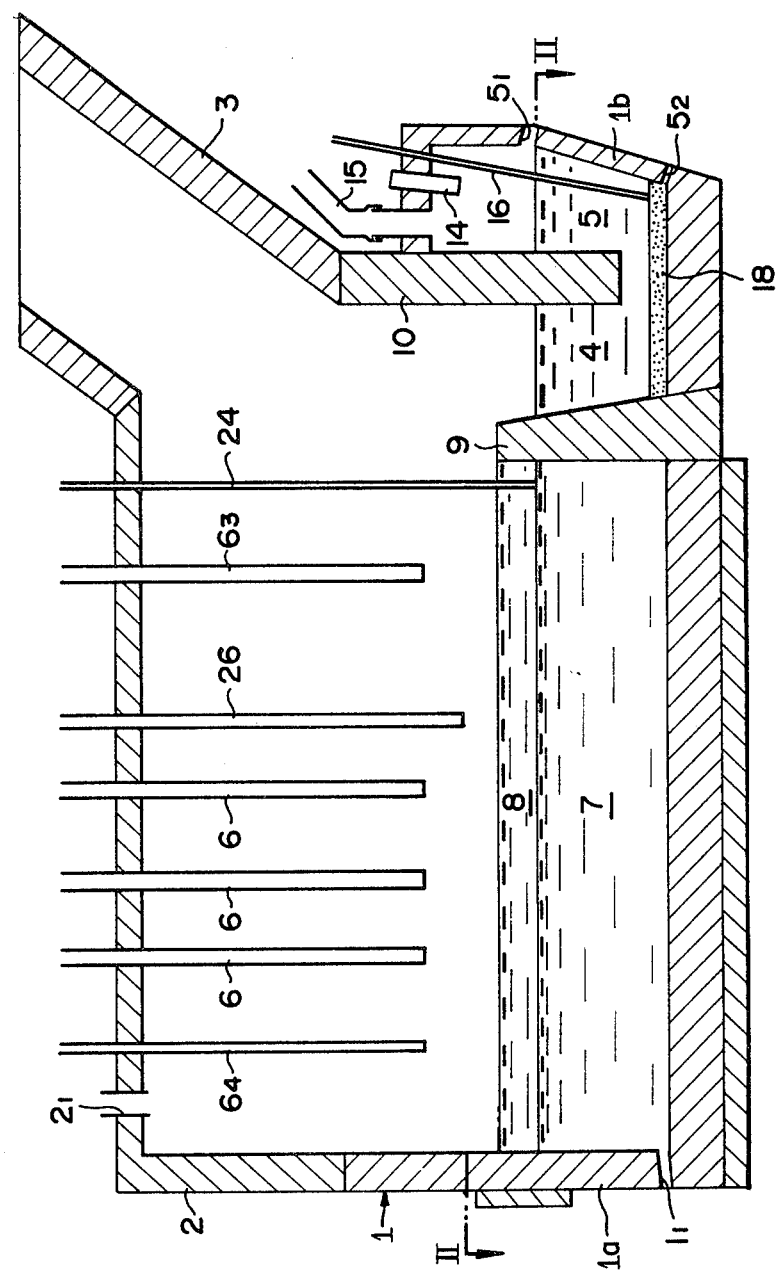
FIG. 1 shows a cross-sectional side view of one embodiment of an apparatus useful for gasifying a carbonaceous material according to the present invention.

As shown in FIG. 1, the apparatus of the present invention comprises a reactor 1 having a dam 9 therein (the dam acting to form first and second portions 1a, 1b on the respective left- and right-hand sides thereof), a fixed ceiling 2 connected to the reactor 1 in a gaslight fashion, a fixed duct 3 connected to the ceiling (2), a wall 10 depending from the fixed duct 3 into the second portion 1b of reactor 1 to form a slag settling chamber 4 and slag discharging chamber 5 (these chambers being connected by the open zone below wall 10), and blowing lances 6 (three lances in this embodiment) positioned on the first portion 1A of reactor 1 to discharge oxygen, steam or $CO_2$ gas and coal powder towards the bath of molten iron therein. The dam 9 will allow the heating slag 8 on top of the molten iron bath 7 to overflow into the slag settling chamber 4.

Figure 6A:
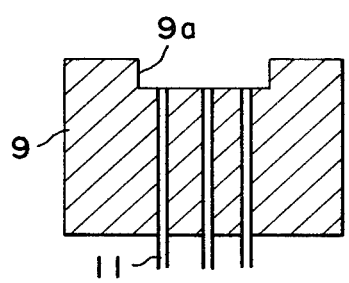
FIGS. 6A and 6B show cross-sectional views of various configurations of dam portions of the apparatus of the present invention.
Figure 6C:
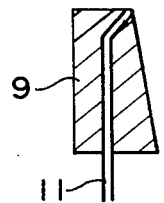
FIGS. 6C and 6D show further cross-sectional views of the dams shown in FIGS. 6A and 6B.

The reactor 1 is usually constructed to be rectangular or circular (not illustrated) in horizontal cross-section, but in order to let the slag on the molten iron bath surface flow over dam 9 more effectively, reactor may be shaped in cross-section to include a converging area 1C (see FIG. 3). The dam 9 may include one or more top indentations 9a or 9b (see FIGS. 6A and 6B) and also a plurality of pipes 11 may extend upwardly through the dams to discharge preheated combustion exhaust gas or preheated air along the bottoms of the indentations to blow the slag over the top of the dam. As shown in FIG. 6C, the top surface of the dam 9 may be horizontally oriented, whereas as shown in FIG. 6D, the top surface of the dam 9 may be sloped downwardly as it extends towards the chamber 4. The height of the dam 9 is chosen such that the residence time of the slag 8 in the first portion 1a of reactor 1 will not ordinarily exceed about 2 hours. The slag 8 will flow over the dam 9 and stay in the setting chamber 4, and then move to the discharging chamber 5 after the iron droplets in the slag are almost perfectly separated out at the bottom of the second portion 1b of reactor 1. Then the slag is continuously discharged out of the second portion 1b of the reactor through a discharging hole $5_1$. The positions of this discharging hole and the lower end of the compartment wall 10 are so determined that air flowing through the discharging hole $5_1$ into the second portion 1b of the reactor may be stopped by the liquid seal of the slag 8. A denotes tap hole $5_2$ provides for removal of the deposited iron 18. A burner 14 is provided for heating the slag discharging chamber 5 (the heating burner 14 is used to heat the chamber 5 before the operation, thereby preventing the solidification of the slag during the operation or oxidizing of the slag). An exhausting duct 15 is provided for the combustion exhaust gas. A level gauge 16 is provided for the deposited iron 18 (the level gauge 16 is provided to control the amount of iron lest the connection of the slag from chamber 4 to chamber 5 become obstructed). A tap hole $1_1$ is provided for removing the molten iron from the first portion 1a of reactor 1.

Figure 4:
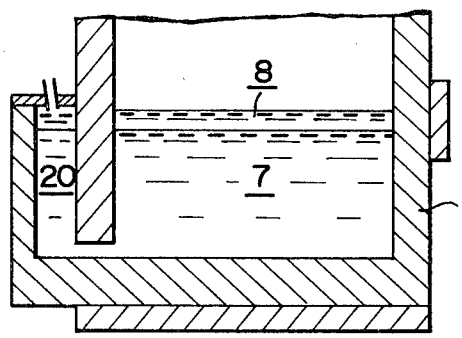
FIG. 4 shows on an enlarged scale a cross-sectional view of a side portion of a gasification apparatus constructed in accordance with another embodiment of the present invention.
Figure 5:
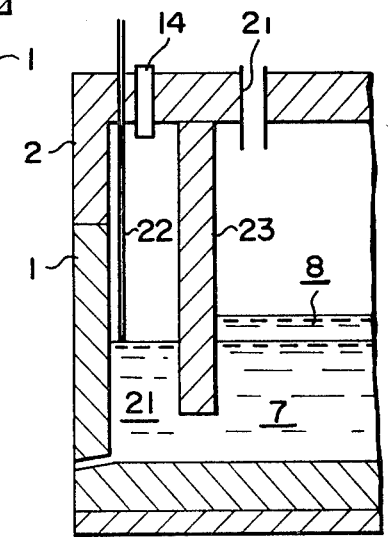
FIG. 5 shows on an enlarged scale a cross-sectional view of a side portion of a gasification apparatus constructed in accordance with a further embodiment of the present invention.

In the apparatus of the present invention (cooling or water-cooling jackets or cooling pipes) can be set in the slag line part of the inner wall or outer wall of the reactor and in the reactor bottom refractory for the purpose of improving the durability of the vessel. Further, as shown in FIGS. 4 and 5, separate chambers 20 and 21 for measuring the bath surface level of molten iron in the reactor can be provided. In FIG. 5, the chamber 21 is differentiated from the reactor portion 1a by a compartment wall 23 and level gauge 22 is positioned therein. The molten iron is poured into the reactor 1 through a sealable pouring inlet $2_1$ provided in the fixed ceiling 2. This embodiment of the apparatus the reactor need not necessarily include the slag settling chamber and slag discharging chamber, but may be in the form of a one chamber reactor in which the slag can be safely and continuously discharged or in the form of two chambers: the reactor portion and a slag settling chamber.

Figure 7A:
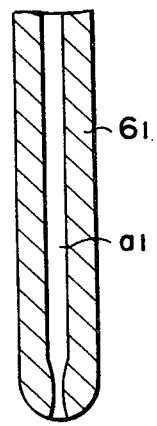
FIGS. 7A and 7B show cross-sectional views of two respective blowing lances useful in the apparatus of the present invention.
Figure 7B:
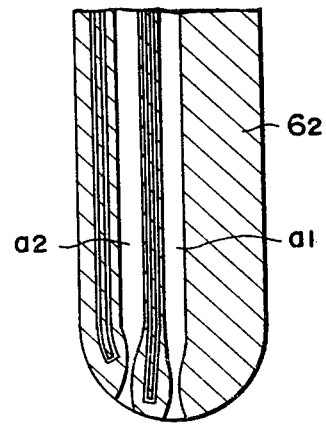
Figure 7C:
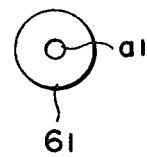
FIGS. 7C and 7D show respective bottom views of the blowing lances shown in FIGS. 7A and 7B.
Figure 7D:
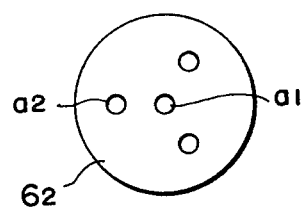

Turning now to the blowing lances useful in reactor 1, FIGS. 7A–7D show such blowing lances which can feed the raw material coal, oxygen jet, carrier gas onto the molten iron, the blowing lance having a single nozzle (FIGS. 7A and 7C) or multiple nozzles (FIGS. 7B and 7D). The blowing lance $6_2$ in FIGS. 7B and 7D has a central nozzle $a_1$ and peripheral nozzles $a_2$ arranged around the central nozzle. A mixed fluid of steam and coal is blown out through the central nozzle $a_1$ and oxygen is blown through the peripheral nozzles $a_2$, and the lance is designed to be able to keep the pressure and temperature of the steam such that the steam may reach the hot spot as superheated steam.

A blowing lance $6_3$ (see FIG. 1) is used for the purpose of accelerating the gasification of unreacted coal suspended in the slag. A low dynamic pressure lance is used. This blowing is particularly effective to improve the efficiency of the utilization of coal and to prevent unreacted coal from being accompanied into the slag. At the same time a lance 26 is employed for measuring the temperature of the molten iron bath and for sampling.

It is preferable that the distance between the blowing lances and the molten iron bath surface be adjusted such that a so-called hard blow of a top blowing converter furnace for making steel is achieved but controlled so as not to damage the refractory on the bottom of the reactor. A blowing lance blows flux onto the surface of the bath of molten iron. A level gauge 24 measures the molten iron bath level. It is preferable that the distance between the fixed ceiling 2 and the stationary slag surface be 3 to 5 times the depth of the molten iron bath, considering the foaming of certain basicity slag and the scattering of the slag and molten iron. Of course, it should be noted that a positive pressure must be maintained within the reactor during its operation. Therefore, the pouring inlet hole and the openings of the lance and others are all made to be of sealed or sealable structures.

In the above-mentioned apparatus, the bath of molten iron 7 which has a temperature of about 1500° C., is always stored in the reactor and is poured in through a sealable pouring inlet hole $2_1$. Oxygen, steam and coal powder are added through the blowing lances 6 onto the molten iron in the reactor and, at the same time, flux is added therein through the lance $6_4$.

In this case, as the coal powder and steam are added to the high temperature hot spot formed by the oxygen jet simultaneously blown in and further the oxygen and steam are blown in through blowing lance $6_3$ of a low dynamic pressure for accelerating the gasification of coal in the slag set on the slag outlet, the dissolution and thermal decomposition of the coal, the CO-producing reaction and the water gas reaction will be effectively achieved. The flux blown in through the lance $6_4$ causes the slag to have a basicity of 1.2 to 1.3 and a melting point of about 1400° C. or and prevents iron loss due to evaporation. But the inherent object of the added flux is to absorb sulfur in the coal. It is needless to say that, if the noted object is attacined, the basicity and melting point of the slag need not be taken into account. By the way, a burnt lime powder, converter slag powder, fluorspar, iron ore or soda ash are used as slagging promoters for the flux. The flux may be mixed into the oxygen, steam and coal powder independently or into the mixed fluid and discharged by the blowing lances 6.

The standard amount of coal added to the reactor is usually about 0.3 ton/ton of molten iron/hour. That of oxygen is 610 Nm³/t of coal. That of steam is 180 kg/t of coal at 300° C. under 10 to 30 kg/cm². The standard amount of the flux is somewhat different depending on the kind of the flux used, but is 47 kg/ton of coal. By adding the raw coal material and gasifying agent to the hot spot, their amounts can be easily increased to be 4 to 5 times as large as the above-mentioned standards. The temperature measurement and sampling of the molten iron bath during the operation are done with the lance 26. Considering the measured value, the molten iron temperature and carbon content in the molten iron are controlled to about 1500° C. and 1.0 to 2%, respectively. By the way, the temperature of the molten iron bath is controlled preferably by setting the quantitative ratio of oxygen and steam. The level of the molten iron bath in the reactor 1 is measured with the level gauge 24 to control the floating slag 8 on the bath surface by overflow over the dam 9 to keep it always constant. The coal gas generated in the reactor 1 is recovered through the fixed duct 3. On the other hand, as mentioned above, the excess slag flows out of the dam 9, accumulates in the settling chamber 4 (where the iron droplets are almost perfectly separated), then moves to the discharging chamber and is continuously discharged out of the reactor through the discharging hole $5_1$. When the excess slag overflows dam 9, if a proper preheated exhaust gas or air is injected through a plural pipes 11 arranged in the dam 9, the outflow of the slag will be promoted, together with the operating effect of the indentations 9a and 9b. The separated and stored iron droplets. 18 will be properly measured with the level gauge 16 and will be removed from the reactor portion 1b through the tape hole $5_2$ before the connection of the slag is obstructed. The heating burner 14 is used as required. The combustion gas in the slag discharging chamber 5 is taken out through the duct 15 and can be used as a gas for adding a raw material to be gasified and a flux by a recovering device (not illustrated).

When the operation is interrupted to repair the reactor or other components, the molten iron and slag are taken out through the tap holes $1_1$ and $5_2$ after the molten iron is dephosphorized and desulfurized, if required, and the molten iron is recycled to an adjacent spare gasfying device (not illustrated) by a ladle or the like. Further, even during the dephosphorizing and desulfurizing treatments, only the oxygen is blown against the molten iron through the blowing lance, together with the addition of the dephosphorizing and desulfurizing agents, therefore only CO gas is produced by the reaction of oxygen with carbon in the molten iron. Therefore, by the use of a spare device, a comparatively short time of interruption of the coal gas production is enough.

Figure 8A:
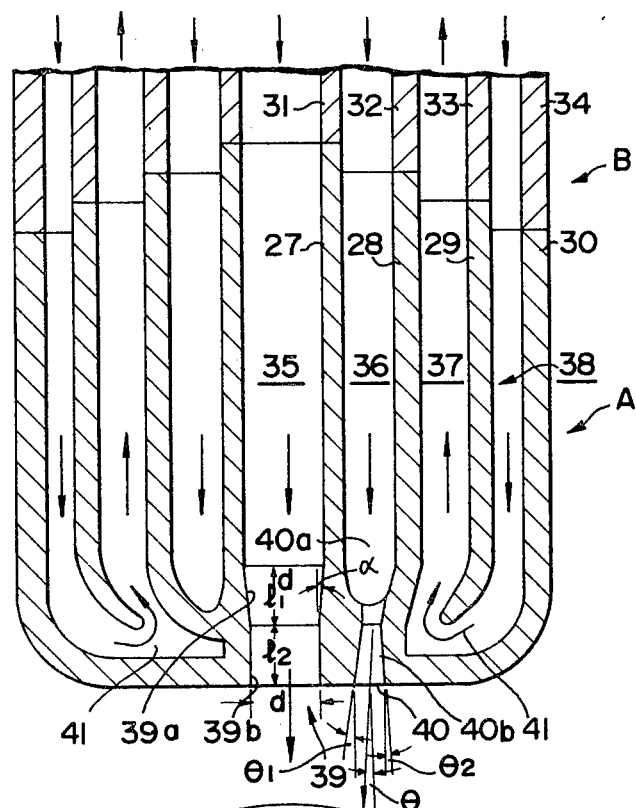
FIG. 8A shows on an enlarged scale a cross-sectional view of an optimum embodiment of blowing lance useful in the apparatus of the present invention.
Figure 8B:
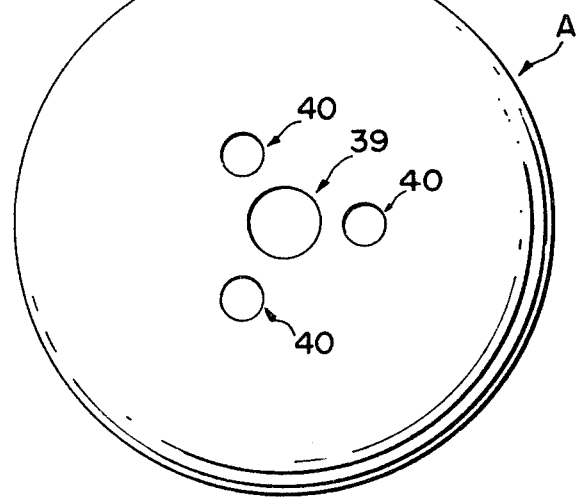
FIG. 8B shows a bottom view of the blowing lance of FIG. 8A.

An optimum embodiment of the blowing lance having multi-nozzles to be used in the present invention is shown in FIGS. 8A and 8B. Within a nozzle head part A, a feeding path 35 for such powder as, for example, coal powder, a carrier gas and, as required, a flux powder, oxygen jet feeding path 36, cooling water discharging path 37 and cooling water feeding path 38 are concentrically formed in this order from the center side to the outer peripheral side. The nozzle head part A is closed on the lower surface except for a central nozzle 39 opening in the center part and a plurality (3 in the illustrated embodiment) of peripheral nozzles 40 opening as separated by equal angles from one another along a circle concentric with the central nozzle 39. The powder feeding path 35 is connected at the lower end to the central nozzle 39. The oxygen jet feeding path 36 is connected at the lower end to the respective peripheral nozzles 40. The cooling water feeding path 38 and cooling water discharged path 37 are connected at the lower ends with each other through a connecting path 41 below a cylindrical wall 29 formed within the nozzle head part A. The upper end parts of the respective cylindrical walls 27 to 30 of the nozzle head part A are respectively of the same diameters as of the above-mentioned respective cylindrical walls 27 to 30 forming a lance body B and are connected to the respective lower ends of an inner pipe 31, intermediate pipe 32, partitioning pipe 33 and outer pipe 39. Though not illustrated in the drawing, the inner pipe 31 is connected at the upper end thereof to a tank (not illustrated) for a powder of such solid carbonaceous material as coke or such flux as burnt lime, converter slag, fluorspar, iron ore or soda ash and a tank (not illustrated) for such carrier gas as $CO_2$ gas, air, recycled make gas, combustion exhaust gas, coke furnace gas or steam. The powder of the solid carbonaceous material or flux is led together with the carrier gas to the central nozzle 39 through the powder feeding path 35 formed within the inner pipe 31 and cylindrical wall 27. The intermediate pipe 32 is connected at the upper end thereof to an oxygen source tank (not illustrated). Oxygen is led to the respective peripheral nozzles 40 through the oxygen jet feeding path 36 formed between the innermediate pipe 32 and inner pipe 31 and between the cylindrical walls 27 and 28. The partitioning pipe 39 is connected at the upper end thereof to a discharged water reservoir (not illustrated). The outer pipe 34 is connected at the upper end thereof to a water feeding tank (not illustrated). Water passes through the cooling water feeding path 38 formed between the outer pipe 34 and partitioning pipe 33 and between the cylindrical walls 29 and 30, reaches a connecting path 41 at its lower end, passes through the connecting path 41 and is discharged through the cooling water discharging path 37 formed between the cylindrical walls 28 and 29 and between the intermediate pipe 32 and partitioning pipe 33 to cool the nozzle head part A and lance body B.

The central nozzle 39 is structured by forming the inlet part 39a connected to the lower end of the power feeding path 35 and the cylindrical part 39b which is a throat part connected to the lower end of the inlet part so as to be concentric with the axis of the powder feeding path 35. The inlet part 39a is so formed as to be gradually reduced in the diameter downward from the lower end of the powder feeding path 35, that is, to the jetting outlet so that the inner peripheral wall may form an invented conical trapezoid. The cylindrical part 39b is of the same diameter as the lower end of the inlet part 39a and opens as a jetting outlet at the lower end on the lower bottom surface of the nozzle head port A. The powder fed together with the carrier gas through the powder feeding path 35 is pressurized and accelerated through the inlet part 39a and cylindrical part 39b and is jetted straight on the extension of the cylindrical part.

The angle $\alpha$ of inclination of the peripheral wall of the inlet part 39a to the axis of the powder feeding path 35, the length $l_1$ in the axial direction of the inlet part 39a, the diameter d of the cylindrical part 39b and the length $l_2$ in the axial direction of the cylindrical part 39b are not particularly limited. However, if the angle $\alpha$ of inclination of the peripheral wall of the inlet part 39a is too large, the resistance to the powder will be so large that it is preferable to make the angle $\alpha$ of inclination as small as possible so long as the necessary powder speed is obtained.

Further, the peripheral nozzle 40 is formed of a cylindrical part 40a which is a throat part connected to the lower end of the oxygen jet feeding path 36 and a divergent part 40a connected to this cylindrical part 40a. The cylindrical part 40a is formed as inclined by an angle $\theta$ diagonally downware so that the lower end side may approach the axis of the central nozzle 39 from the inner bottom part of the U-shaped closed wall at the lower end of the oxygen feeding path 36. The divergent part 40b is formed to be gradually expanded in the diameter toward the lower end side from the upper end side. Its axis is on the same straight line as the axis of the cylindrical part 40a. The lower end side is formed as inclined by the angle $\theta$ in the direction approaching the axis side of the central nozzle 39. The peripheral wall on the powder feeding path 35 side of the divergent part 40b is inclined by an angle $\theta_1$ in the direction approaching the axis of the central nozzle 39 with respect to the axis. The peripheral wall on the other side is inclined by an angle $\theta_2$ ($\theta_1 > \theta_2$) in the direction deviating from the axis of the central nozzle 39. Oxygen fed through the oxygen jet feeding path 36 is pressurized and accelerated through the cylindrical part 40a and divergent part 40b, is jetted on the extension of the divergent part 40 and is blown into the molten iron so as to intersect the powder flux at the hot spot.

Examples of the present invention using the dissolving tanks of the shape shown in FIGS. 1, 2, 6B and 6D shall be explained in the following.

EXAMPLE 1

5 tons of molten iron (of a temperature—1650° C. and C=3.5%) were poured into a reactor (or a width=900 mm, length=1800 mm and depth=600 mm) lined with an Mg-Cr refractory and slag settling chamber (of a width=900 mm, length=500 mm and depth=600 mm) and in which the height from the bath surface of the molten iron to the fixed ceiling was 1400 mm. Therefore, the depth of the molten iron bath was about 450 mm and the thickness of the slag layer was about 150 mm. The blowing lance for oxygen, steam and coal powder was of a nozzle diameter of 7.2 to 12 mm. Two lances each of a central nozzle and 3 peripheral nozzles were used. A mixed fluid of coal powder and steam was fed through the central nozzle. Oxygen was fed through the peripheral nozzles. In the amount blown in per lance, oxygen was 375 Nm$^3$/hr under 10 kg/cm$^2$, steam was 110 kg/hr at 300° C. under 10 kg/cm$^2$, coal (Bayswater coal) was 625 kg/hr at 0.5 to 3 mm and of a water content not more than 1%. By the way, as the temperature of the molten iron decreased to about 1550° C. when it was poured, first only oxygen was fed, the temperature was elevated to about 1550° C. and then the blowing in of coal powder and steam was started. As a flux, burnt lime was added at a rate of 57.5 kg/hr through another lance. Also, fluorspar was properly added through still another lance depending on the state of the discharge of the slag. The depth L of the steel bath depression/the depth Lo of the steel bath so-called in making steel in a converter furnace was about 0.58 to 0.79 and was properly varied.

As a result of working in the above method for about 180 minutes, the average gas composition of the obtained produced gas was as shown in Table 1 and the amount of the generated gas was 2620 Nm$^3$/hr on the average. Therefore, the rate of utilization of C was 95.3%. However, in this example, the dust was not made to recycle. The Fe system dust in the obtained produced gas was 33 gr/Nm$^3$ on the average. On the other hand, in the molten iron, C was 1 to 1.5% and the temperature gradually fluctuated between 1500° and 1560° C. S in the molten iron gradually rose from substantially 0.02% at the start to 0.1% to be saturated. Further, the produced slag was of a basicity of 1.1 to 1.3 and was presumed to be about 220 kg/hr as converted.

TABLE 1 (%)

| CO | H$_2$ | CO$_2$ | O$_2$ | N$_2$ | CH$_4$ |
|---|---|---|---|---|---|
| 64.7 | 31.5 | 1.9 | 0.4 | 1.2 | 0.30 |

Figure 6B:
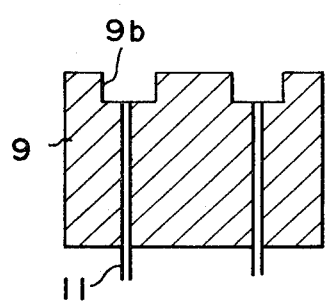
Figure 6D:
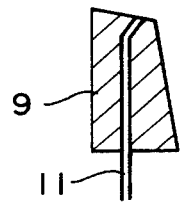

By the way, in discharging the slag, by the system shown in FIGS. 6B and 6D, the gas led directly from a CO gas bottle was jetted. Further, when the gas was well preheated before the molten iron was poured in the molten iron, the slag flowed out without being greatly solidified. In this case, as the operation was for about 120 minutes, the discharging hole 5$_1$, was closed and some stored iron of droplet was made to flow out through the lower tap hole 5$_2$.

EXAMPLE 2

Two lances each provided with a single Laval nozzle of 12 mm in diameter were used and were provided at the same lance height as in Example 1 and oxygen, steam and coal powder were mixed in the same amounts of addition as in Example 1 and were blown in through the lances. However, in this case, the coal powder was preheated to about 200° C. by using a flashed dryer, was mixed in superheated steam at 300° C. under 8 kg/cm$^2$ by a diffuser system, was then mixed with oxygen under the same pressure and was blown as an oxygen jet onto the molten iron. As compared with the case of Example 1, as the gas/powder was larger and the condensation of steam was presumed to be less, the conveyance of the coal powder was smoother. The average gas composition in the case that the gasification was made for 60 minutes was as in Table 2.

TABLE 2 (%)

| CO | H$_2$ | CO$_2$ | O$_2$ | N$_2$ | CH$_4$ | NH$_3$ | CmHn | SO$_2$ | H$_2$S |
|---|---|---|---|---|---|---|---|---|---|
| 63.5 | 32.6 | 2.0 | 0.29 | 1.4 | 0.21 | Trace | Trace | < 10 ppm | < 3 mg/nm$^3$ |

The average amount of the produced gas was 2690 Nm$^3$/hr. The rate of utilization of C was 96.1%. By the way, the condition of S and the amount of addition of burnt lime were the same as in Example 1.

EXAMPLE 3

1250 kg of coal powder crushed to be 0.5 to 3 mm in diameter and 60 kg of a burnt lime powder were mixed together in a powder feeder and were jetted onto an iron bath with oxygen gas as a carrier through a lance provided with a Lavel nozzle of 25 mm in diameter. On the other hand, steam was separately fed by using a lance provided with a straight nozzle of 10 mm in diameter. In this case, the amount of addition of oxygen was the total amount of 750 $Nm^3/hr$ in Examples 1 and 2. By the way, the above mentioned two lances were bound together, were fixed at a lance height of 330 mm and were set to blow in toward the center of the bath surface. The other conditions were the same as in Examples 1 and 2. The composition of the gas produced in the case of working for 60 minutes was as in Table 3.

TABLE 3 (%)

| CO | $H_2$ | $CO_2$ | $O_2$ | $N_2$ | $CH_4$ | $NH_3$ | CmHn | $SO_4$ | $H_2S$ |
|---|---|---|---|---|---|---|---|---|---|
| 62.3 | 34.1 | 2.0 | 0.32 | 1.1 | 0.16 | Trace | Trace | 37 ppm | 3 mg/$Nm^3$ |

The average amount of the generated gas was 2570 $Nm^3/hr$ and the rate of utilization of C was 91.5%.

EXAMPLE 4

In order to improve the rate of utilization of C in Example 3, a lance having one low dynamic pressure for feeding oxygen and steam was added in a position displaced from the above mentioned bound lances. That is to say, the two lances were set respectively in positions at ⅓ equal division in the length direction of the bath. The main lance was fixed at a lance height of 300 mm and the low dynamic pressure lance at 330 mm. A lance provided with a Lavel nozzle of 4.2 mm in diameter was used for the low dynamic pressure lance. Oxygen was added at 12 $Nm^3/hr$ under 7 $kg/cm^2$ and steam was added at 20 kg/hr at 300° C. under 7 $kg/cm^2$. Therefore, the oxygen and steam fed through the bound main lances were decreased by these amount. In this case, the iron bath temperature and gas composition did not vary less than in Example 3 but the gas amount of CO in % somewhat increased. The gas composition in the case of working for 60 minutes was as in Table 4. The average amount of the generated gas was 2585 $Nm^3/hr$. The rate of utilization of C was 93.2%.

TABLE 4 (%)

| CO | $H_2$ | $CO_2$ | $O_2$ | $N_2$ | $CH_4$ | $NH_3$ | CmHn | $SO_2$ | $H_2S$ |
|---|---|---|---|---|---|---|---|---|---|
| 63.1 | 33.5 | 1.7 | 0.3 | 1.2 | 0.21 | Trace | Trace | 28 ppm | 3 mg/$Nm^3$ |

In the above mentioned examples, examples of using coal as a solid carbonaceous material are mostly shown. However, it is needless to say that this invention can be applied also to such other carbonaceous materials as pitch, coal tar, coke or the like.

While the present invention has been described with reference to particular embodiments thereof, it will be understood that numerous modifications may be made by those skilled in the art without actually departing from the spirit and scope of the invention as defined in the appended claims.

We claim:

1. A method of gasifying solid carbonaceous material which has been pulverized, said method comprising the steps of simultaneously (a) blowing at least one array of jets containing oxygen towards the surface of a body of molten iron so as to impinge on the surface of the body of molten iron and form at least one hot spot thereon, each said array of jets being ejected from a separate blowing lance located externally of the body of molten metal and each array of jets being issued from its respective blowing lance at a velocity of Mach 1 to Mach 3, and (b) blowing a separate stream of a mixture of said pulverized carbonaceous material and a carrier gas toward each separate hot spot along a path extending interiorly of each associated array of jets, the pulverized carbonaceous material, upon contact with its associated hot spot, effectively dissolving in the molten iron bath and thermally decomposing.

2. The method as defined in claim 1 wherein each array of jets in step (a) emanate from peripheral nozzles in a single blowing lance and wherein each associated stream in step (b) emanates from a central nozzle in the associated single blowing lance.

3. The method as defined in claim 1 wherein said pulverized carbonaceous material is selected from the group consisting of coal, pitch and coal tar.

4. The method as defined in claim 3 wherein said pulverized carbonaceous material is powdered coal which has a granularity of 4 mm or less and a water content of 4% or less.

5. The method as defined in claim 1 wherein each stream in step (b) also includes a flux powder.

6. The method as defined in claim 5 wherein said flux powder is selected from the group consisting of burnt lime powder, converter slag, fluorspar, iron ore and soda ash.

7. The method as defined in claim 1 wherein said carrier gas for each stream in step (b) is selected from the group consisting of steam, $CO_2$ gas, air, oxygen, recycled make gas, combustion exhaust gas and coke furnace gas.

8. The method as defined in claim 1 wherein said oxygen-containing jets in step (a) also include gases selected from the group consisting of steam and $CO_2$.

9. The method as defined in claim 1 including the step of controlling the amount of molten iron in said bath and the amount of slag thereon to maintain a constant value.

* * * * *